United States Patent [19]

Schoenfelder

[11] 3,863,621

[45] Feb. 4, 1975

[54] SOLAR WALL SYSTEM

[75] Inventor: James L. Schoenfelder, Iowa City, Iowa

[73] Assignee: Iowa State University Research Foundation, Inc., Ames, Iowa

[22] Filed: Aug. 31, 1973

[21] Appl. No.: 393,593

[52] U.S. Cl. .............................. 126/270, 237/1 A
[51] Int. Cl. ............................................. F24j 3/02
[58] Field of Search ............ 126/270, 271; 237/1 A

[56] References Cited
UNITED STATES PATENTS

| | | | |
|---|---|---|---|
| 2,559,871 | 7/1951 | Gay | 126/270 X |
| 2,595,905 | 5/1952 | Telkes | 126/270 |
| 2,601,905 | 7/1952 | Anderegg | 126/270 X |
| 2,671,441 | 3/1954 | Harris | 126/270 |
| 2,680,437 | 6/1954 | Miller | 126/270 |
| 2,918,709 | 12/1959 | Corcoran | 126/270 X |
| 3,102,532 | 9/1963 | Shoemaker | 126/270 |

Primary Examiner—William F. O'Dea
Assistant Examiner—Peter D. Ferguson
Attorney, Agent, or Firm—Zarley, McKee, Thomte & Voorhees

[57] ABSTRACT

A solar wall system wherein the wall has a collector plate for gathering solar energy and converting it into heat energy. The collector plate is an apertured collector plate having substantially no materials loss when compared to a solid plate of like material, weight and dimensions, but has increased surface area. One embodiment of the invention relates to a transparent solar wall system capable of transmitting light to the internal parts of a building structure. The transparent wall system utilizes the louvered collector plate. Another embodiment of the invention relates to a very efficient opaque solar wall system which employs gang-nail collector plates.

16 Claims, 7 Drawing Figures

PATENTED FEB 4 1975
3,863,621
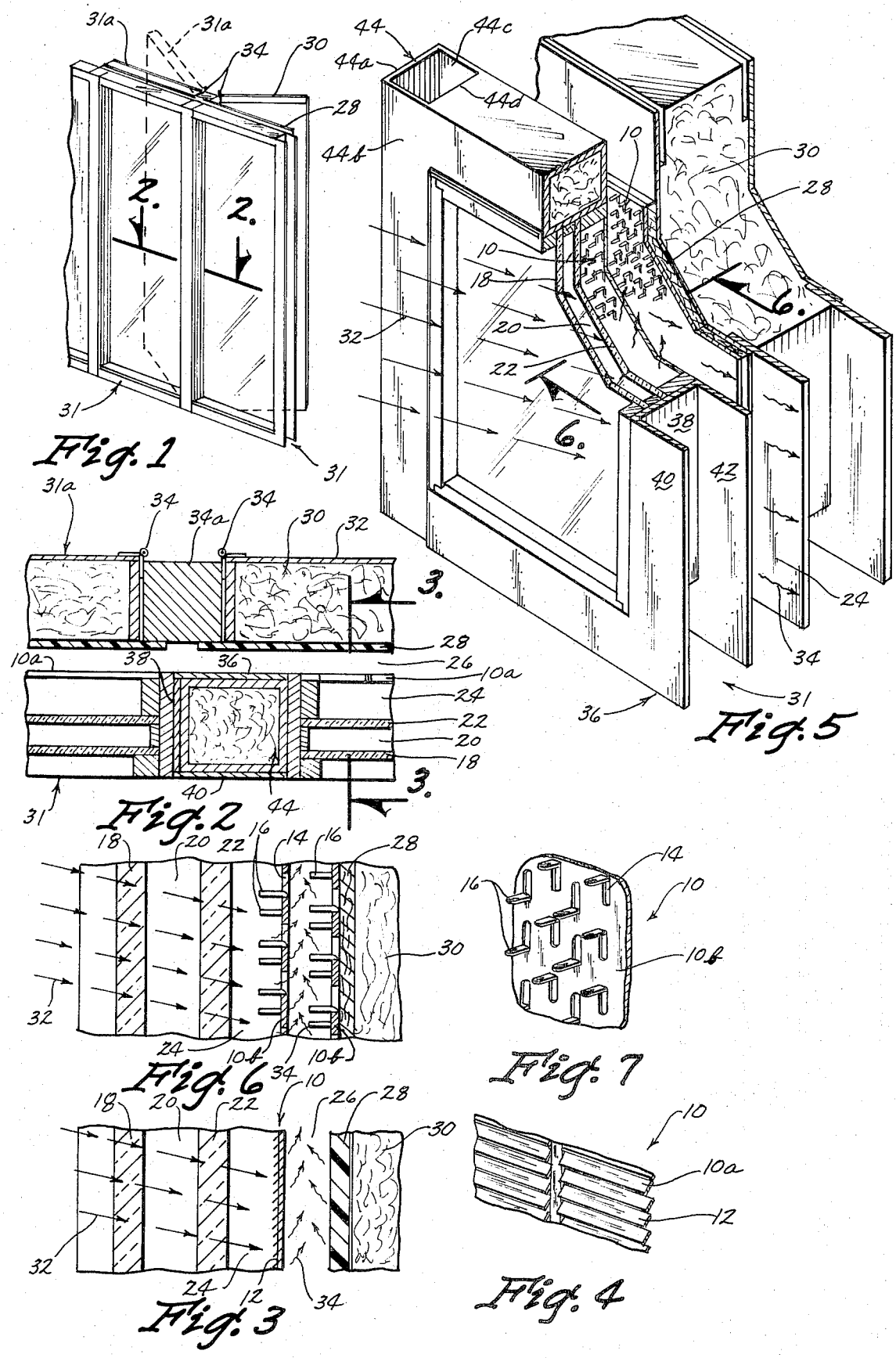

SOLAR WALL SYSTEM

BACKGROUND OF THE INVENTION

Solar heat collecting wall systems represent one possible method of relieving a part of our current energy crisis. Approximately one-third of all energy consumed in this country during the year 1971 was for space heating and air conditioning. This is a tremendous drain on our country's fuel reserves. Efficient and consumer acceptable solar wall systems which would utilization of solar energy as an alternative to fossil fuels for heating and lighting would be a great aid in relieving this current crisis.

Solar wall systems have been developed heretofore. However, no solar wall system yet developed has generally been accepted by the public as a convenient heat source for homes and other building structures. Part of the problem with prior art solar wall systems is that most, if not all of them, have been opaque. Thus while the wall system will allow for capturing solar energy and converting it into heat energy, it is at the sacrifice of allowing light to enter to the interior of the building structure. Prior art solar wall systems have been opaque because it was thought that in order to efficiently collect solar energy an opaque wall system was deemed essential. In other words, a solar wall system which would allow light into the interior of a building structure would not be as efficient since it would allow escape of heat energy. Of course, since building structures having large opaque areas in the walls thereof, are not favored by the public this factor has considerably decreased the acceptability of solar heat as a means of heating homes and other buildings. Accordingly, there is a real need in the art for the development of a solar wall system which will efficiently collect solar energy, convert that energy into heat energy and at the same time, allow for transmission of light into the interior of the building structure.

An additional deficiency of prior art solar wall systems relates to their general inability to efficiently collect solar energy and convert that energy into heat without a substantial loss of the heat. It has now been discovered that solar wall systems, utilizing special collector plates for the solar energy, will allow for increased efficiency in gathering solar energy and converting that energy into heat energy. In other words, the amount of heat energy which is allowed to dissipate without being utilized is decreased.

Another deficiency with many prior art solar wall systems relates to their generally complicated structure and the long times necessary for jobsite construction. The solar wall system of this invention can, if desired, be built in modules or units which can quickly and efficiently be constructed at the construction jobsite.

Accordingly, one object of this invention is to develop a solar wall system which will efficiently collect heat energy and still allow for passage of light into the interior of a building structure.

Yet another object of this invention is to provide a solar wall system having a special type of solar energy collection plate which more efficiently will convert solar energy into heat energy.

Still another object of this invention is to provide a solar wall system in modular units which can be quickly constructed at the construction jobsite with a minimum of required skill and with great efficiency.

The method of accomplishing these and other objects will become apparent from the following description of the invention.

SUMMARY OF THE INVENTION

This invention relates to solar wall systems employing a unique and specially designed apertured collector plate. The utlization of the collector described hereinafter allows for increased efficiency in conversion of solar energy into heat energy. In one embodiment the invention relates to a transparent, or see-through, wall system which allows light to pass into the interior of a building structure and which allows those within the building to see out.

In another embodiment the invention relates to an extremely efficient opaque solar wall system. In yet another embodiment of the invention relates to a solar wall system, comprised of modular units, which can be put together at a construction jobsite efficiently and with a minimum of required skill.

DESCRIPTION OF THE DRAWINGS

FIG. 1 is a perspective view of a transparent solar wall system employing exterior and interior modular units.

FIG. 2 is a sectional view along line 2—2 of FIG. 1.

FIG. 3 is a sectional view of FIG. 2 along line 3—3 showing a cross section of a transparent wall construction where a louvered collector plate is employed.

FIG. 4 is a fragmentary view of a louvered collector plate.

FIG. 5 is an expanded perspective view of exterior and interior modules for a solar wall system employing gang-nail collector plates.

FIG. 6 is a sectional view of FIG. 5 along lines 6—6 showing in cross section wall construction where gang-nail collectors are employed.

FIG. 7 is a fragmentary review of a gang-nail collector plate.

DETAILED DESCRIPTION OF THE INVENTION.

A collector plate, as utilized herein, refers to a metal sheet which is utilized to collect the solar energy. Typically collector plates are painted a dark highly absorbtive color such as flat black color. Solar rays hit the plate and are converted thereon into heat energy as the plate is warmed by the solar energy. Such collector plates can be made of any suitable material of high solar absorbtivity and are typically made from copper, aluminim, steel and galvanized iron. Many types of collector plates have been employed in the prior art. For example, the prior art has utilized flat sheet-like collector plates, corrugated collector plates, collector plates faced with copper water pipes and metallic fibrous materials. For examples of typical prior art collector plates see the following U.S. patents: Harris, U.S. Pat. No. 2,671,441; Anderegg, U.S. Pat. No. 2,601,905; Gay, U.S. Pat. No. 2,559,870; Johnston, U.S. Pat. No. 2,998,005; Thomason, U.S. Pat. No. 3,295,591; and Hay, U.S. Pat. No. 3,563,305. The efficiency of any solar wall system depends directly upon the efficiency of the collector plate in gathering solar energy and converting it into heat energy.

It has now been discovered that increased solar energy conversion into heat energy can be otained when specially designed collector plates are utilized. These plates can generally be described as apertured collector plates. An apertured collector plate, as that term is used herein, does not mean a collector plate which merely has holes punched therein. A collector plate having holes punched therein will naturally have a materials loss when compared to a solid plate of like material, weight and dimensions. Thus, the surface area of the overall collector plate will be decreased. In accord with this invention it has been discovered that apertured collector plates which have substantially no materials loss when compared to a solid plate of like material, weight and dimension, provide increased surface area, and in addition, will transmit light therethrough. The increased surface area results in a greater increased efficiency for collection of solar energy and conversion of that energy into heat energy. Thus, while the collector plate does have apertures therein, the material displaced in forming the apertures is not completely removed from the collector plate. Examples of such collector plates, formed without a materials loss, are shown in FIGS. 4 and 7. FIG. 4 shows a louvered collector plate wherein the metal is punched or otherwise pressed in a dye to provide louvers therein. Thus there are apertures present but the material displaced in forming the apertures is not removed from the collector plate. Obviously then, the overall surface area for collection of solar energy is increased. The collector plate is referred to herein as 10 and the louvered collector plate is referred to as 10a with the gang-nail collector plate, to be described in detail hereinafter, referred to as 10b.

The louvered collector plate, 10a formed by having generally downwardly and outwardly displaced louvers 12 formed in a metal sheet. These louvers will provide increased surface areas for gathering solar energy and converting it into heat energy and, as explained in more detail hereinafter, will allow light to be transmitted therethrough. As a result, one looking through a solar wall system employing louvered collector plates can see out to the exterior of this structure.

Collector plate 10b is a gang-nail collector plate. Gang-nail collector plate, 10b, has apertures 14 and upstanding tabs 16. Of course, other collector plates having apertured surfaces wherein the apertured collector plate has no materials loss when compared with a plate of like size, weight and dimensions can easily be made. Thus, the louvered collector plate 10a, and the gang-nail collector 10b, are shown herein as representative only. The key feature being that these plates have no materials loss when compared with like plates of similar size, weight and dimension but on the other hand, do have an increased surface area. A description of the action of these plates in collecting solar rays will be provided hereinafter.

FIGS. 1, 2, 3 and 4 represent a solar wall system having a louvered collector plate and are designed to provide a transparent, or more accurately perhaps a see-through solar wall system wherein light is transmitted to the interior of the structure and one standing there within can see out to the exterior thereof. FIGS. 5, 6, and 7 represent an opaque solar wall system having enhanced efficiency for collection of solar energy, conversion of that energy into heat energy and distribution thereof within the building structure. For purposes of general description of the invention and for clarity, the invention will first be described in connection with the cross sectional views of FIGS. 3 and 6. FIG. 3 is a sectional view of a solar wall construction employing a louvered collector plate. FIG. 6 is a similar cross sectional view of a solar wall construction employing gang-nail collector plates.

While the collector plates shown in the drawings generally relate to a preferred modular unit solar wall system, it should be appreciated that the solar wall system can equally as well, if desired, be built as an entire wall section. Where this is done the views of FIGS. 3 and 6 generally will represent, a sectional view of the various layers, in laminar relationship, comprising the wall structure. Conventional wall frame means can be utilized to hold the various solar wall system layers into their hereinafter described relationship and thus this conventional frame structure will not be described here in detail.

In both FIGS. 3 and 6, the left hand side thereof, represents the exteriorly exposed portion of the wall, with the right hand side thereof representing the interiorly disposed portion of the wall. Speaking now with specific reference to FIG. 3, there is shown a transparent or see-through solar wall system. This system comprises an exteriorly exposed transparent member 18, a void space 20, and spaced apart from but behind the exteriorly exposed transparent member 18 is an interiorly disposed transparent member 22. Of course, there can be more than two transparent members and if desired, the number can be from two up to four. However, for purposes of cost efficiency two transparent members are preferred. The transparent members can be conventional plate glass, or made of transparent plexiglass material. Thermopane glass can also be employed. Behind the most interiorly disposed transparent member 22, is an additional air space 24 and spaced apart from transparent member 22 and behind said member is a louvered collector plate 10a. Immediately behind louvered collector plate 10a is an air space chamber 26 for collection and movement of warm air. The rear wall of space chamber 26 can be defined by any conventional panel material 28 which in FIG. 3 is transparent. Behind panel 28 and in abutting relationship therewith is an insulation layer 30. Insulation layer 30 can comprise any well known insulating material. For example, it can be foam plastic insulation such as urethane foam; it can be a fiber insulation such as fiberglass butt; or it can be a loose fill insulation such as fiberglass pellets and the like. Insulation layer 30 is the most interiorly disposed portion of the solar wall system. Of course, behind insulation layer 30 can be any wall panel construction suitable for exposure within the internal wall of the building. This could conceivably be wood paneling, any conventional dry wall construction, or the like. As will be explained hereinafter, with regard to the embodiment shown specifically in FIG. 3, the insulation layer is movably connected to the remainder of the solar wall system so that the insulation layer can be moved away therefrom to allow light to pass through the solar wall and to allow those within the building structure to see outside. In this specific embodiment, therefore, panel 28 is preferably another see-through panel of glass or plexiglass material.

During in use operation the solar wall system described in FIG. 3 operates as follows. Sun rays represented by arrows 32 pass through transparent members 18 and 20 and hit the louvers 12 of louvered collector plate 10a. The collector plate is warmed by the sun rays 32 and the collector plate 10a, which is typically painted flat black, converts the sun rays 32 into heat energy. Because of the increased surface area of collector plate 10a over a simple metal sheet collector plate or over a corrugated collector plate, the absorption and coversion of solar energy into heat energy is increased. The heat energy warms the air in air space chamber 26 and the warm air 34 can be swept away for heating the building structure. Heat loss of the collected heat energy is significantly decreased by the presence of panel 28 and insulation layer 30. Heat loss by conduction to the exterior of the wall construction system is prevented by design of collector plate 10a, and the spaced apart relationship of the transparent members 18 and 22. The means for sweeping away warm air and circulating it through the building structure are conventional but will briefly be described hereinafter.

The wall construction shown in FIG. 6 is similar to that shown in FIG. 3 but is specifically designed for highly efficient opaque solar wall system. Those portions of the structure of like construction to those previously described will not be described here in detail. Like numerals have been utilized to represent like structure. In FIG. 6 there is shown a first gang-nail collector plate 10b and spaced apart therefrom but behind first gang-nail collector plate 10b is a second gang-nail collector plate also represented by numeral 10b. There chamber 26, then, is defined by the back of first gang-nail collector plate 10b and the front of second gang-nail collector plate 10b. Behind second gang-nail collector plate 10b is a panel 28 which can be wood or other opaque conventional materials since this wall system is an opaque one. Spaced directly behind panel 28 and in abutting relationship thereto is insulation layer 30. In the construction of FIG. 6, those rays which pass through the apertures of the first gang-nail collector plate 10b will strike the second collector plate 10b which is preferably in offset relationship with regard to the first collector plate 10b. As a result an enhanced efficiency of solar energy collection is achieved. Moreover, the combined increased exposed surface areas of gang-nail collector plates 10b make them extremely efficient in solar energy collection.

FIGS. 1 and 2 show with particularity the solar wall system construction wherein the wall is comprised of modular units with an exterior modular unit generally designated at 31 and a movably mounted interior modular unit generally designated at 31a. This system is designed for utilization wherein the solar wall system is to be a see-through solar wall. the interior modular unit comprises the insulation layer 30 and any appropriate covering thereover. Positioned in front of the interior modular unit 31a is a stationary transparent member. The movably mounted interior modular unit when in closed position is in abutting relationship with the interiorly disposed transparent member 28. Thus when the interiorly disposed modular unit is moved away from abutting relationship with interiorly disposed transparent member 28 light can pass through transparent members 18 and 22, through louvered collector plate 10a, and through transparent member 28 and into the internal structure of the building. It is desirable to keep the movably mounted interior modular unit in a closed position during early morning hours so that collector plate 10a can satisfactorily reach a warm temperature. Thereafter once sufficient heat exchange is occuring, interior insulation layer 30 and the modular unit which incorporates it can be moved away from the exterior modular unit by the movable connection to provide a see-through condition. For exemplary purposes, this can be seen in FIG. 2, interior modular unit 31a is shown as being hingedly connected by hinge 34 to a post member 34a so that it can be swung rearwardly.

Exterior modular unit 31 comprises the exposed exteriorly disposed transparent member 18, any interiorly disposed transparent members 22, and the collector plate 10b. The frame of exterior modular unit 31 is uniquely designed to provide for easy jobsite construction of solar walls. The frame can be aluminum, or any other suitable metal or wood. The modular unit is preferably rectangular in shape and has two adjacent sides forming open frame members of U-shaped cross section. This is best seen in FIG. 5 wherein the open frame members generally designated in FIG. 5 as 36 are comprised of an outwardly extending sidewall 40 a back standing sidewall 38 and an additional outward extending sidewall 42. The other sides of the modular unit 31 comprise closed frame member 44 formed by walls 44b, 44a, 44c and a wall 44d, not depicted in FIG. 5. The dimensions of closed frame member 44 are such that it will matingly receive the open frame member 36. Thus as can be seen in FIG. 2, open frame member 36 will matingly receive closed frame member 44 to provide a solid fit. In this fashion modular units can be built one matingly receiving the other until a solar wall system of desired size is achieved. Preferably, the open space in closed frame member 44 is filled with insulation. This will allow for an even increased efficiency in thermal retention. As can be seen from FIG. 5, the interior modular unit 31a can also be comprised of like configuration having open frame members and closed frame members which will matingly receive one another. In such a manner a solar wall system can be built by unskilled labor and does not require a detailed familiarity with the intricate construction of the entire wall system. In addition each modular is in and of itself surrounded by an insulation layer which makes heat loss significantly less.

As heretofore mentioned, the method of storing and circulating warmed air 34 which is warmed in air chamber 26 is conventional. For example, a fan system and warm air storage unit can be located remotely in building structure with the fan system being in communication with warm air 34 in air chamber 26. The warmed air is swept into a storage system wherein it is forced throughout the interior of the building by conventional warm air conveying and conduction means. Cold air from the home can be recirculated back into the fan system wherein it is warmed by incoming hot air and then recirculated throughout the home. This cyclical process can continue in a generally continuous fashion. Heat storage, can be accomplished in conventional means by utilization of conventional heat sinks such as water which is warmed, sodium sulphate salt which is warmed, and the like.

As can be seen, the various combinations of structure of this invention provide an extremely efficient solar heat collection means and wall system therefor. The system also provides a solar wall system which will allow light to pass therethrough and yet extremely efficiently collect solar energy. Additionally, the solar wall system provides for convenient modules which can be easily made, transported and constructed on the jobsite. Thus the invention accomplishes all of the heretofore stated objectives.

What is claimed is:

1. A solar wall system comprising,
   an exteriorly exposed transparent member,
   a collector plate, adapted to be exposed to solar energy, interiorly disposed with respect to, and spaced apart from, said transparent member to define a first void space between said transparent member and said collector plate,
   said collector plate having a plurality of openings and having a mass equal to solid plate of like material, wherein said openings increase the total surface area of said collector plate as compared to a solid plate of like material,
   a second void space behind said collector plate for collection and movement of warm air, and
   a most interiorly disposed wall structure element, said second void space being defined by said collector plate and said wall structure element.

2. The wall system of claim 1 wherein said collector plate is a gang-nail plate.

3. The wall system of claim 1 wherein said collector plate is a louvered plate.

4. The wall system of claim 1 where said plate is comprised of a material of high solar absorbtivity selected from the group consisting of copper, aluminum, steel and galvanized iron.

5. The wall system of claim 4 wherein the collector plate is black.

6. The wall system of claim 1 wherein said wall system is comprised of a plurality of modular units.

7. A solar wall system for buildings and the like, comprising, in general laminar construction within a frame means,
   an exteriorly exposed first transparent member,
   a second transparent member spaced apart from said first member and interiorly disposed therefrom,
   a first apertured collector plate spaced apart from and behind said second transparent member, said apertured collector plate having
   substantially no material loss when compared to a solid plate of like material, weight and dimension, but having increased surface area,
   and an insulation layer spaced with respect to said collector plate to form a chamber for warm air circulation therebetween.

8. The wall system of claim 7 wherein said first collector plate is a louvered collector plate.

9. The wall system of claim 8 wherein behind said first collector plate and in front of said insulation layer is last transparent member.

10. The wall system of claim 9 wherein said insulation layer is movable from a first position adjacent the last transparent member to a position removed therefrom whereby the wall system is capable of transmitting light into the interior of said structure.

11. The wall system of claim 7 wherein behind said first collector plate and in front of said insulation layer is a second collector plate.

12. The wall system of claim 7 wherein said wall system is comprised of exterior modular units and interior modular units, said exterior units comprising the exposed, exteriorly disposed transparent member, at least one interiorly disposed transparent member and the first collector plate, and said interior modular unit comprising the insulation layer.

13. The wall system of claim 12 wherein exterior modular units are rectangular and have two adjacent sides with open frame members of U-shaped cross section and the other two sides defining closed frame members, and means on said closed frame members to matingly receive said open frame members.

14. The wall system of claim 13 wherein said closed frame members define a cavity therewithin, said cavity being insulation filled.

15. The wall system of claim 12 wherein said interior modular unit comprises a second collector plate and said insulation layer.

16. A solar wall system comprising,
    a wall structure element,
    a gang nail collector plate in said wall structure element, adapted to be exposed to solar energy, said collector plate having a plurality of openings and having a mass equal to a solid plate of like material, wherein said openings increase the total surface area of said collector plate as compared to a solid plate of like material.

* * * * *